(12) United States Patent
Shimizu

(10) Patent No.: US 6,227,328 B1
(45) Date of Patent: May 8, 2001

(54) POWER STEERING APPARATUS

(75) Inventor: Yoshinobu Shimizu, Sakai (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/308,619

(22) PCT Filed: Sep. 2, 1998

(86) PCT No.: PCT/JP98/03943

§ 371 Date: May 20, 1999

§ 102(e) Date: May 20, 1999

(87) PCT Pub. No.: WO99/16655

PCT Pub. Date: Apr. 8, 1999

(30) Foreign Application Priority Data

Sep. 26, 1997 (JP) .................................................. 9-262365

(51) Int. Cl.[7] .................................................. B62D 5/06
(52) U.S. Cl. .................. 180/422; 180/421; 180/441; 180/446; 701/41
(58) Field of Search .................. 180/421, 422, 180/423, 441, 442, 446; 701/41, 42

(56) References Cited

U.S. PATENT DOCUMENTS

| | | | |
|---|---|---|---|
| 4,499,964 | * | 2/1985 | Abe et al. ............................ 180/142 |
| 4,856,607 | * | 8/1989 | Sueshige et al. .................... 180/142 |
| 5,208,752 | * | 5/1993 | Kodama et al. .................. 364/424.05 |
| 5,267,627 | * | 12/1993 | Frank et al. ......................... 180/132 |
| 5,558,177 | * | 9/1996 | Inaguma et al. .................... 180/422 |
| 5,761,627 | * | 6/1998 | Seidel et al. ........................ 701/41 |
| 6,052,633 | * | 4/2000 | Fukuyame et al. .................... 701/41 |
| 6,064,166 | * | 5/2000 | Kaji ................................... 180/442 |
| 6,073,721 | * | 6/2000 | Grabowski .......................... 180/422 |
| 6,089,344 | * | 7/2000 | Baughn et al. ...................... 180/446 |
| 6,092,012 | * | 7/2000 | Shimizu .............................. 701/41 |
| 6,144,909 | * | 11/2000 | Sakamai et al. ...................... 701/41 |

FOREIGN PATENT DOCUMENTS

| | | |
|---|---|---|
| 59-118577 | 7/1984 | (JP) . |
| 60-255576 | 12/1985 | (JP) . |
| 2-197465 | 8/1990 | (JP) . |
| 6-43188 | 6/1994 | (JP) . |
| 8-198129 | 8/1996 | (JP) . |
| 8-244636 | 9/1996 | (JP) . |

\* cited by examiner

*Primary Examiner*—Brian L. Johnson
*Assistant Examiner*—Daniel Yeagley
(74) *Attorney, Agent, or Firm*—Rabin & Champagne, PC

(57) ABSTRACT

A power steering apparatus is provided which is adapted to generate a steering assist force by a hydraulic pressure generated by a pump driven by an electric motor. The apparatus includes: a steering angle detection section (11, S1, S4) for detecting an absolute steering angle on the basis of a steering angle midpoint and a relative steering angle; a first control section (31, S6, S8 to S10) for actuating the electric motor in response to the steering angle detection section detecting an absolute steering angle of not smaller than a first threshold value; and a second control section (31, S6, S11, S9, S10) for actuating the electric motor in response to a steering angle change becoming not smaller than a second thresold value which is smaller than the first threshold value when the absolute steering angle detection is not carried out by the steering angle detection section.

9 Claims, 2 Drawing Sheets

POWER STEERING APPARATUS

This is the national stage of International Application PCT/JP98/03943, with an international filing date of Sep. 2, 1998 and Japanese application 9-262365 filed Sep. 26, 1997.

TECHNICAL FIELD

The present invention relates to a power steering apparatus which applies a steering assist force to a steering mechanism by a hydraulic pressure generated by a pump driven by an electric motor.

BACKGROUND ART

Power steering apparatuses are conventionally utilized which assist operation of a steering wheel by supplying a working oil from an oil pump to a power cylinder coupled to a steering mechanism. The oil pump is driven by an electric motor, and a steering assist force is generated by the power cylinder in accordance with the rotational speed of the electric motor. Since the steering assist force is not required when the steering wheel is not turned, a so-called "stop-and-go control" is conducted, wherein the electric motor is off when the steering assumes a straight travel steering state virtually at a steering angle midpoint and, in response to detection of a steering angle change greater than a predetermined level, the electric motor is actuated.

The detection of the steering angle midpoint is, for example, based on an output of a steering angle sensor provided in association of the steering mechanism. The steering sensor is adapted to detect a steering angle change with respect to an initial steering angle, i.e., a relative steering angle. The initial steering angle corresponds to a steering angle observed when an ignition key switch is actuated. Accordingly, the initial steering angle does not always correspond to the steering angle midpoint, but often corresponds to a steering angle at which the steering wheel is offset from the steering angle midpoint. Therefore, steering angle data are sequentially sampled for determination of frequency of occurrence of steering angle data, and the most frequent steering angle data is defined as steering angle data corresponding to the steering angle midpoint, for example.

On the other hand, a greater steering assist force is required at low speed traveling than at high speed traveling. There has been a proposal that the electric motor is actuated in response to a slight steering angle change (e.g., 3 degrees) when the vehicle speed is lower than 10 km/h, and actuated in response to a greater steering angle change (e.g., 9 degrees) when the vehicle speed is not lower than 10 km/h. Thus, a catch-up (caught feeling) can be suppressed particularly at the low speed traveling.

However, no steering assist force is required when the steering angle is close to the steering angle midpoint. Accordingly, if the electric motor is actuated in response to a slight steering angle change when the vehicle speed is lower than 10 km/h, the steering assist is provided in excess, resulting in an energy loss.

It may be considered to employ a steering angle based electric motor actuation control in combination with a vehicle speed based electric motor actuation control.

However, the steering angle midpoint is not determined immediately after the startup of the vehicle engine, but the determination thereof becomes possible after the vehicle travels a certain distance. Hence, the absolute steering angle cannot be detected during a certain period immediately after the startup of the engine, so that the electric motor actuation control cannot be performed on the basis of the steering angle.

For this reason, the electric motor is actuated in response to a slight steering angle change at the low speed traveling irrespective of the steering angle. Therefore, improvement in the steering feeling comes first with the energy saving sacrificed to some extent.

DISCLOSURE OF THE INVENTION

It is an object of the present invention to solve the aforesaid technical problems and to provide a power steering apparatus which ensures enhancement of the energy saving without deterioration of the steering feeling during the period in which the detection of the steering angle is impossible.

In accordance with the present invention, there is provided a power steering apparatus adapted to generate a steering assist force by a hydraulic pressure generated by a pump driven by an electric motor, the apparatus comprising: steering angle detection means (steering angle sensor 11 in FIG. 1, and Steps S1, S4 in FIG. 2) for detecting an absolute steering angle on the basis of a steering angle midpoint and a relative steering angle; first control means (CPU 31 and the like in FIG. 1, and Steps S6, S8 to S10 in FIG. 2) for actuating the electric motor in response to that the steering angle detection means detects an absolute steering angle of not smaller than a first threshold value; and second control means (CPU 31 and the like in FIG. 1, and Steps S6, S11, S9, S10 in FIG. 2) for actuating the electric motor in response to that a steering angle change becomes not smaller than a second threshold value which is smaller than the first threshold value when absolute steering angle detection is not carried out by the steering angle detection means.

With this arrangement, where the absolute steering angle detection is carried out, the electric motor is actuated in response to that the absolute steering angle reaches the relatively large first threshold value. Therefore, the electric motor is not actuated in response to a slight steering angle change when the steering angle is close to the steering angle midpoint, whereby the energy saving can be enhanced.

On the other hand, when the absolute steering angle detection is not carried out, the electric motor is actuated in response to that the steering angle change reaches the relatively small second threshold value. Therefore, the catch-up can effectively be prevented which is liable to occur particularly when the steering angle is relatively large. Thus, the steering feeling can be improved.

By thus employing different threshold values for the absolute steering angle detection period and for the absolute steering angle non-detection period, the energy saving can be enhanced without deterioration of the steering feeling.

The state where the steering angle detection means carries out the absolute steering angle detection may be a state where the steering angle midpoint has been determined. Upon determination of the steering angle midpoint, the detection of the absolute steering angle can be achieved by employing the steering angle midpoint and the relative steering angle.

The power steering apparatus may further comprise means for actuating the electric motor on condition that the absolute steering angle reaches a relatively large third threshold value (which may be equal to the first threshold value) if the absolute steering angle is at a level within a predetermined range around the steering angle midpoint, and actuating the electric motor in response to that the steering angle change reaches a fourth threshold value (which may be equal to the second threshold value) which is smaller than the third threshold value if the absolute steering angle is at a level out of the predetermined range around the steering angle midpoint, when the absolute steering angle detection is carried out by the steering angle detection means. With this arrangement, the electric motor is not actuated needlessly when the steering angle is close to the steering angle midpoint, while the electric motor is actuated in response to a slight steering angle change when the steering angle is relatively large. Thus, the catch-up can be prevented.

The power steering apparatus may further comprise vehicle speed detection means (vehicle speed sensor 12 in FIG. 1 and Step S1 in FIG. 2) for detecting a vehicle speed, and means (Step S5, S6 in FIG. 2) which permits switching between an absolute steering angle based motor actuation control and a steering angle change based motor actuation control in accordance with whether or not the absolute steering angle detection is carried out by the steering angle detection means, when the vehicle speed detected by the vehicle speed detection means is lower than a predetermined level. With this arrangement, the motor actuation control can properly be performed at the low speed traveling for proper steering assist.

The foregoing and other objects, features and effects of the present invention will become more apparent from the following description of the embodiment with reference to the attached drawings.

EMBODIMENT OF THE INVENTION

Figure 1:
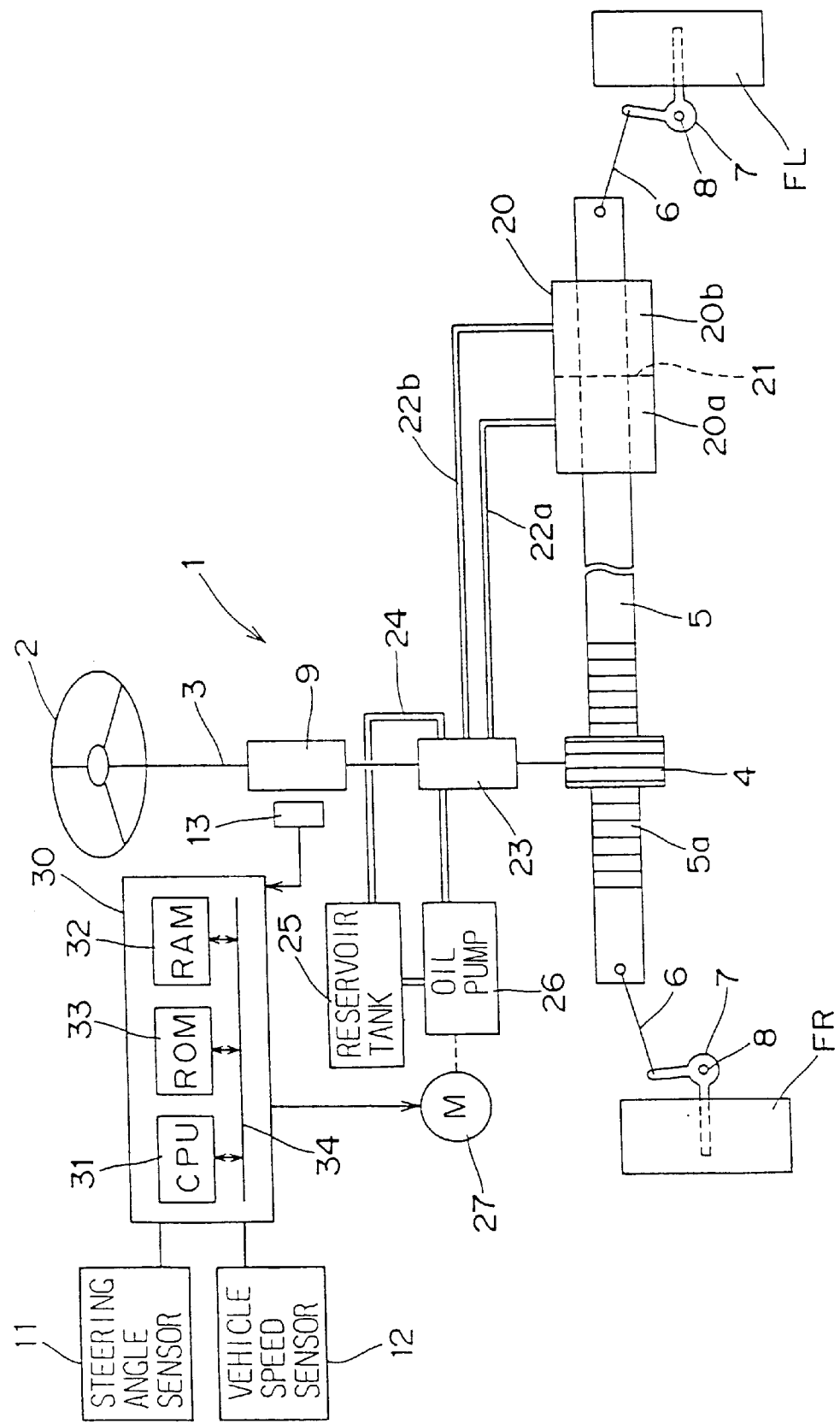
FIG. 1 is a conceptual diagram illustrating the basic construction of a power steering apparatus according to one embodiment of the present invention.

FIG. 1 is a conceptual diagram illustrating the basic construction of a power steering apparatus according to one embodiment of the present invention. This power steering apparatus is provided in association with a steering mechanism 1 of a motor vehicle for applying a steering assist force to the steering mechanism 1.

The steering mechanism 1 includes a steering wheel 2 to be operated by a driver, a steering shaft 3 coupled to the steering wheel 2, a pinion gear 4 provided at a distal end of the steering shaft 3, and a rack shaft 5 having a rack gear 5a meshed with the pinion gear 4 and extending transversely of the motor vehicle. Tie rods 6 are connected to opposite ends of the rack shaft 5, and further connected to knuckle arms 7 which respectively support left and right front wheels FL and FR as steerable wheels. The knuckle arms 7 are respectively provided rotatably about king pins 8.

With this arrangement, when the steering wheel 2 is operated to rotate the steering shaft 3, the rotational motion is converted into a linear motion transverse to the motor vehicle by the pinion gear 4 and the rack shaft 5. The linear motion is converted into rotational motions of the knuckle arms 7 about the king pins 8, thereby achieving the steering of the left and right front wheels FL, FR A torsion bar 9 which is adapted to be twisted in accordance with the direction and magnitude of a steering torque applied to the steering wheel 2 and a hydraulic pressure control valve 23 which is adapted to change its valve aperture in accordance with the direction and magnitude of the torsion of the torsion bar 9 are incorporated in the steering shaft 3. The hydraulic pressure control valve 23 is connected to a power cylinder 20 for applying a steering assist force to the steering mechanism 1. The power cylinder 20 includes a piston 21 provided integrally with the rack shaft 5, and a pair of cylinder chambers 20a and 20b split by the cylinder 21. The cylinder chambers 20a and 20b are connected to the hydraulic pressure control valve 23 via oil supply/return lines 22a and 22b, respectively.

The hydraulic pressure control valve 23 is disposed in an oil circulation line 24 which extends through a reservoir tank 25 and an oil pump 26. The oil pump 26 is driven by an electric motor 27, so that a working oil contained in the reservoir tank 25 is pumped up and supplied to the hydraulic pressure control valve 23. An excess of the working oil is returned to the reservoir tank 25 from the hydraulic pressure control valve 23 via the oil circulation line 24.

When a torsion is exerted on the torsion bar 9 in one direction, the hydraulic pressure control valve 23 supplies the working oil to one of the cylinder chambers 20a, 20b of the power cylinder 20 via one of the oil supply/return lines 22a, 22b. When a torsion is exerted on the torsion bar 9 in the other direction, the hydraulic pressure control valve supplies the working oil to the other of the cylinder chambers 20a, 20b via the other of the oil supply/return lines 22a, 22b. When virtually no torsion is exerted on the torsion bar 9, the hydraulic pressure control valve 23 is in a so-called equilibrium state, so that the working oil is not supplied to the power cylinder 20 but circulated in the oil circulation line 24. An exemplary construction of the hydraulic pressure control valve is disclosed in detail, for example, in Japanese Unexamined Patent Publication (KOKAI) No. 59-118577 (1984)

When the working oil is supplied to either one of the cylinder chambers of the power cylinder 20, the piston 21 moves transversely of the motor vehicle. Thus, a steering assist force acts on the rack shaft 5.

The magnitude of the steering assist force is adjusted by controlling a voltage to be applied to the electric motor 27 which drives the oil pump 26. The motor 27 is controlled by an electronic control unit 30. The electronic control unit 30 determines the voltage to be applied to the motor 27 on the basis of an output signal of a steering angle sensor 11 for detecting the steering angle of the steering wheel 2, an output signal of a vehicle speed sensor 12 for detecting the speed of the vehicle and an output signal of a torque sensor 13 for detecting the direction and magnitude of a torque applied to the torsion bar 9. Thus, the steering assist force is applied to the steering mechanism 1 in accordance with the steering angle, the vehicle speed and the steering torque. The vehicle speed sensor 12 may be adapted to directly detect the vehicle speed or, alternatively, adapted to calculate the vehicle speed on the basis of an output pulse of a wheel speed sensor provided in association with the wheels.

The electronic control unit 30 includes a CPU 31, a RAM 32 which provides a work area for the CPU 31, a ROM 33 storing therein operation programs for the CPU 31, and buses 34 interconnecting these components.

The CPU 31 is operative in accordance with the operation programs stored in the ROM 33 to control the voltage to be applied to the motor 27 so that a proper steering assist force is applied to the steering mechanism 1 in accordance with the steering angle, the vehicle speed and the steering torque.

The steering angle sensor 11 defines as an initial level "0" a steering angle of the steering wheel 2 observed when an ignition key switch is actuated for startup of an engine, and detects a relative steering angle with respect to the initial level. The electronic control unit 30 detects a steering angle midpoint on the basis of steering angle data outputted from the steering angle sensor 11, and calculates, on the basis of the detected steering angle midpoint and the relative steering angle data from the steering angle sensor 11, an absolute steering angle which corresponds to a steering angle of the steering wheel 2 with respect to the steering angle midpoint. The detection of the steering angle midpoint is achieved, for example, by sampling steering angle data from the steering angle sensor 11, then preparing a histogram of values of the steering angle data and, after a predetermined number of data are sampled, determining the most frequent steering angle data as steering angle data corresponding to the steering angle midpoint. For the detection of the steering angle midpoint, any other methods such as disclosed in Japanese Unexamined Patent Publication (KOKAI) No. 8-198129 (1996) can be employed. With any of the methods being employed, the steering angle midpoint is not determined in a certain period immediately after the ignition key switch is actuated to start the operation of the electronic control unit 30. Therefore, the steering angle midpoint is not definitely determined until the vehicle travels a certain distance.

The electronic control unit 30 actuates the motor 27 on the basis of one of Actuation Condition A, Actuation Condition B and Actuation Condition C shown in the following Table 1.

TABLE 1

| Actuation Condition A: | The absolute value of the absolute steering angle is not smaller than a first threshold value (e.g., 9 degrees) or the steering angular speed is not lower than 90 degrees/second. |
|---|---|
| Actuation Condition B: | The steering angle change is not smaller than a second threshold value (e.g., 3 degrees) |
| Actuation Condition C: | The steering angle change is not smaller than a third threshold value (e.g., 16 degrees) or the steering angular speed is not lower than 90 degrees/second |
| (Third threshold > First threshold > Second threshold) | |

The Actuation Condition A is such that the motor 27 is actuated when the absolute value of the absolute steering angle reaches the relatively large first threshold value (e.g., 9 degrees) or when the steering angular speed is not lower than 90 degrees/second. The Actuation Condition A is employed when the vehicle speed is lower than 10 km/h and the steering angle is at a level within a predetermined range around the steering angle midpoint (e.g., 5 degrees, i.e., within a play angle range of the steering wheel 2).

The Actuation Condition B is such that the motor 27 is actuated when the steering angle change reaches the relatively small second threshold value (e.g., 3 degrees). The Actuation Condition B is employed when the vehicle speed is lower than 10 km/h and the steering angle is at a level out of the predetermined range around the steering angle midpoint. Further, when the vehicle speed is lower than 10 km/h and the steering angle midpoint is unknown, the Actuation Condition B is employed because the absolute steering angle cannot be determined.

The Actuation Condition C is such that the motor 27 is actuated when the steering angle change reaches the relatively large third threshold value (e.g., 16 degrees) or when the steering angular speed is not lower than 90 degrees/second. The Actuation Condition C is employed when the vehicle speed is not lower than 10 km/h.

Figure 2:
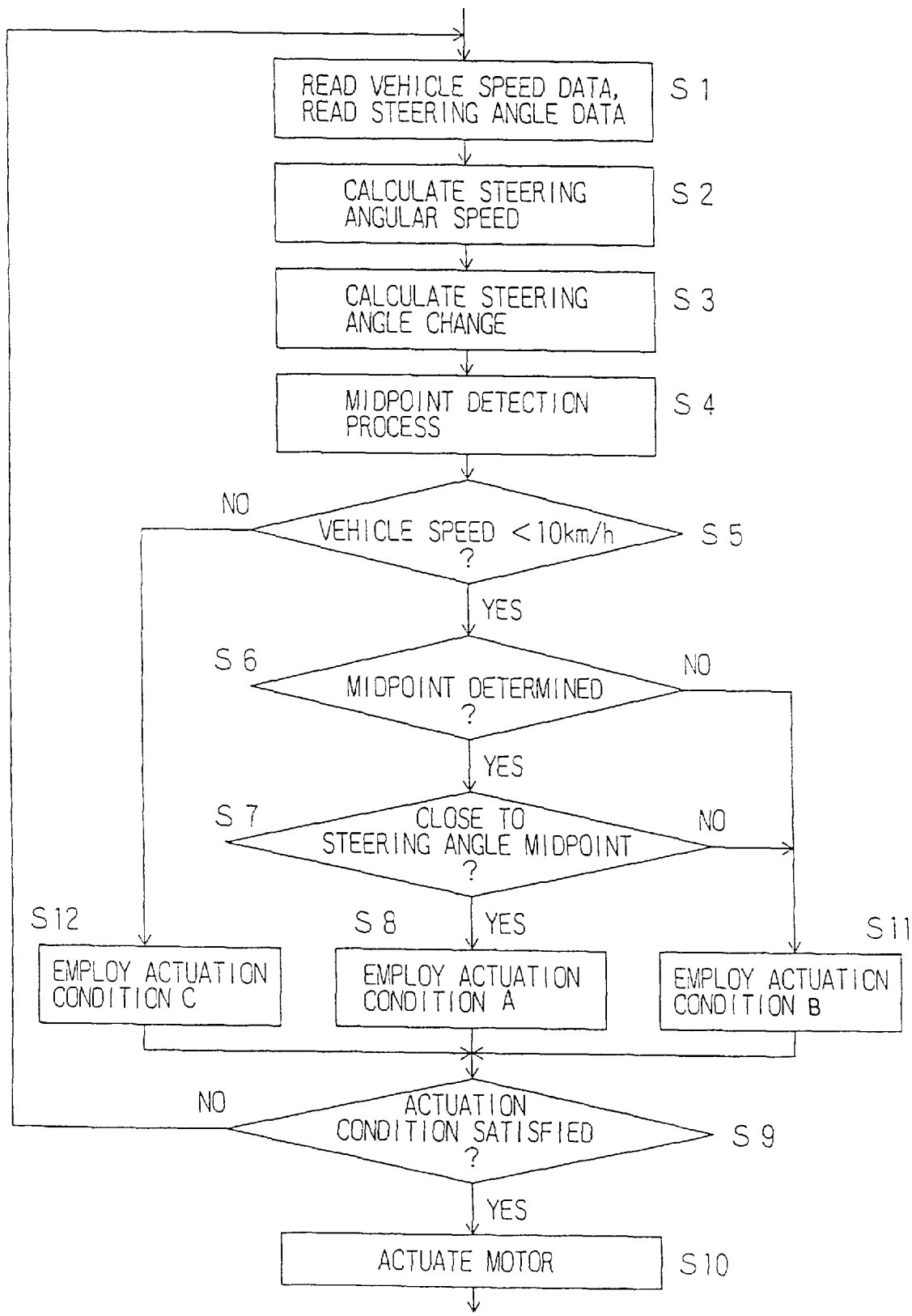
FIG. 2 is a flow chart for explaining a process for electric motor actuation.

FIG. 2 is a flow chart for explaining the operation of the electronic control unit 30 for the actuation of the electric motor 27. Vehicle speed data and steering angle data are read from the vehicle speed sensor 12 and the steering angle sensor 11, respectively (Step S1). On the basis of the steering angle data, a steering angular speed which corresponds to a steering angle change rate is calculated (Step S2), and a steering angle change which corresponds to the amount of a change in the steering angle observed in a steering angle data sampling cycle (e.g., 200 ms) is calculated (Step S3). Then, a midpoint detection process is performed by using the steering angle data read in Step S1 (Step S4). As described above, the steering angle midpoint is not always immediately determined through the midpoint detection process. That is, the determination of the steering angle midpoint is possible or impossible depending on the case.

Subsequently, it is judged whether or not the vehicle speed is lower than 10 km/h (Step S5). If the vehicle speed is lower than 10 km/h, it is judged whether or not the steering angle midpoint has been determined (Step S6). Where the steering angle midpoint has been determined, it is possible to calculate the absolute steering angle on the basis of the steering angle midpoint and the steering angle data from the steering angle sensor 11 and, therefore, it is judged whether or not the steering angle of the steering wheel 2 is at a level within the predetermined range around the steering angle midpoint (Step S7). If this judgment is positive, the aforesaid Actuation Condition A is employed (Step S8) and, if this actuation condition is satisfied (Step S9), the motor 27 is actuated (Step S10). Thus, where the steering angle is at a level close to the midpoint, the motor 27 is not actuated even at the low speed traveling when the absolute value of the absolute steering angle does not reach the relatively large first threshold value and the steering angular speed is lower than 90 degrees/second. Therefore, the motor 27 is not needlessly actuated when the steering angle is close to the steering angle midpoint at which the steering assist is not required. Thus, the energy saving is enhanced.

If it is judged in Step S7 that the steering angle is not close to the midpoint, the Actuation Condition B is employed (Step S11). Thus, where the steering angle is not close to the midpoint at the low speed traveling, the motor 27 is actuated in response to a relatively small steering angle change, whereby the catch-up can effectively be prevented. Thus, a satisfactory steering feeling can be ensured at the low speed traveling.

If it is judged in Step S6 that the steering angle midpoint has not been determined, the Actuation Condition B is employed (Step S11), and whether or not the motor 27 is to be actuated is determined depending on whether or not the Actuation Condition B is satisfied (Steps S9, S10). Therefore, the motor 27 is actuated in response to a relatively small steering angle change over the entire steering angle range before the determination of the steering angle midpoint. Thus, the catch-up can be prevented at the low speed traveling, so that a satisfactory steering feeling can be ensured.

On the other hand, it is judged in Step S5 that the vehicle speed is not lower than 10 km/h, the Actuation Condition C is employed (Step S12). That is, if the steering angle change is relatively large or the steering angular speed is high when the vehicle is not in the low speed traveling, the motor 27 is actuated (Steps S9, S10).

If the actuation condition in Step S9 is not satisfied, the program returns to Step S1. However, the midpoint detection process in Step S4 may be omitted after the determination of the steering angle midpoint.

After the actuation of the motor 27, the motor 27 is stopped if a predetermined condition (e.g., a condition such that the steering angle is kept within the play angle range of the steering wheel 2 for a predetermined period) is satisfied. After the stop of the motor 27, the process sequence from Step S1 is performed. In this case, the midpoint detection process (Step S4) may be omitted after the steering angle midpoint is once determined.

In accordance with the embodiment described above, the motor 27 is actuated in response to the detection of a relatively small steering angle change in the period during which the detection of the absolute steering angle is impossible before the determination of the steering angle midpoint. Thus, a satisfactory steering feeling can be ensured at the low speed traveling. In the period during which the detection of the absolute steering angle is possible after the determination of the steering angle midpoint, the motor 27 is actuated in response to the absolute value of the absolute steering angle reaching the relatively large first threshold value and in response to the steering angular speed becoming not lower than 90 degrees/second. Therefore, the motor 27 is not needlessly actuated when the steering angle is close to the steering angle midpoint after the determination of the steering angle midpoint. Thus, the energy saving can be enhanced.

In accordance with the embodiment, the Actuation Condition A which is adapted to actuate the motor 27 when the steering angular speed is high is employed even if the absolute steering angle is at a level close to the steering angle midpoint. Therefore, a necessary steering assist force can promptly be generated for abrupt steering or the like.

While one embodiment of the present invention has thus been described, it should be understood that the invention can be embodied in any other forms and various modifications can be made within the scope of the present invention as set forth in the claims.

INDUSTRIAL APPLICABILITY OF THE INVENTION

The power steering apparatus according to the present invention is used for applying a steering assist force to a steering mechanism of a motor vehicle.

What is claimed is:

1. A power steering apparatus adapted to generate a steering assist force by a hydraulic pressure generated by a pump driven by an electric motor, the apparatus comprising:
    steering angle detection means for detecting an absolute steering angle on the basis of a steering angle midpoint and a relative steering angle;
    first control means for actuating the electric motor in response to the steering angle detection means detecting an absolute steering angle that is not smaller than a first threshold value; and
    second control means for actuating the electric motor in response to a steering angle change being not smaller than a second threshold value, which is smaller than the first threshold value, when absolute steering angle detection is not carried out by the steering angle detection means due to the steering angle midpoint being undetected.

2. A power steering apparatus as set forth in claim 1, wherein
    the steering angle detection means includes a steering angle sensor for outputting relative steering angle data, and midpoint detection means for determining the steering angle midpoint on the basis of the relative steering angle data outputted from the steering angle sensor,
the power steering apparatus further comprising means for judging whether or not the absolute steering angle detection to be carried out by the steering angle detection means, on the basis of whether or not the steering angle midpoint has been determined by the midpoint detection means.

3. A power steering apparatus as set forth in claim 2, further comprising
    means for actuating the electric motor on a condition that the absolute steering angle reaches a third threshold value which is greater than the second threshold value if the absolute steering angle is at a level within a predetermined range around the steering angle midpoint, and actuating the electric motor in response to the steering angle change reaching a fourth threshold value which is smaller than the third threshold value if the absolute steering angle is at a level out of the predetermined range, when the absolute steering angle detection is carried out by the steering angle detection means.

4. A power steering apparatus as set forth in claim 2, further comprising:
    vehicle speed detection means for detecting a vehicle speed; and
    means for switching between an absolute steering angle based motor actuation control and a steering angle change based motor actuation control in accordance with whether or not the absolute steering angle detection is carried out by the steering angle detection means, when the vehicle speed detected by the vehicle speed detection means is lower than a predetermined level.

5. A power steering apparatus as set forth in claim 1, further comprising:
    means for actuating the electric motor on a condition that the absolute steering angle reaches a third threshold value which is greater than the second threshold value, if the absolute steering angle is at a level within a predetermined range around the steering angle midpoint, and actuating the electric motor in response to the steering angle change reaching a fourth threshold value which is smaller than the third threshold value if the absolute steering angle is at a level out of the predetermined range, when the absolute steering angle detection is carried out by the steering angle detection means.

6. A power steering apparatus as set forth in claim 5, further comprising:
    vehicle speed detection means for detecting a vehicle speed; and
    means for switching between an absolute steering angle based motor actuation control and a steering angle change based motor actuation control in accordance with whether or not the absolute steering angle detection is carried out by the steering angle detection means, when the vehicle speed detected by the vehicle speed detection means is lower than a predetermined level.

7. A power steering apparatus as set forth in claim 1, further comprising:
    vehicle speed detection means for detecting a vehicle speed; and means for switching between an absolute steering angle based motor actuation control and a steering angle change based motor actuation control in accordance with whether or not the absolute steering angle detection is carried out by the steering angle detection means, when the vehicle speed detected by the vehicle speed detection means is lower than a predetermined level.

8. An electric motor actuation control method to be applied to a power steering apparatus having a steering angle detection means for detecting an absolute steering angle on the basis of a steering angle midpoint and a relative steering angle, and having an electric motor for driving a pump for generating a steering assist force, the method comprising:

a first control step of actuating the electric motor in response to the steering angle detection means detecting an absolute steering angle that is not smaller than a first threshold value; and a second control step of actuating the electric motor in response to a steering angle change being not smaller than a second threshold value, which is smaller than the first threshold value, when absolute steering angle detection is not carried out by the steering angle detection means due to the steering angle midpoint being undetected.

9. A method as set forth in claim 5, further comprising the steps of:

actuating the electric motor on a condition that the absolute steering angle reaches a third threshold value which is greater than the second threshold value, if the absolute steering angle is at a level within a predetermined range around the steering angle midpoint, when the absolute steering angle detection is carried out by the steering angle detection means; and actuating the electric motor in response to the steering angle change reaching a fourth threshold value which is smaller than the third threshold value, if the absolute steering angle is at a level out of the predetermined range.

* * * * *